(12) United States Patent
Tanaka

(10) Patent No.: US 7,936,897 B2
(45) Date of Patent: May 3, 2011

(54) IMAGE FORMING APPARATUS

(75) Inventor: Kimiyuki Tanaka, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1357 days.

(21) Appl. No.: 11/111,375

(22) Filed: Apr. 21, 2005

(65) Prior Publication Data

US 2005/0259297 A1 Nov. 24, 2005

(30) Foreign Application Priority Data

Apr. 28, 2004 (JP) ................................. 2004-132949

(51) Int. Cl.
| | |
|---|---|
| G06K 9/00 | (2006.01) |
| G06K 9/36 | (2006.01) |
| G06K 5/00 | (2006.01) |
| G07D 7/00 | (2006.01) |
| G07F 7/12 | (2006.01) |
| G09G 5/00 | (2006.01) |
| H04N 1/40 | (2006.01) |

(52) U.S. Cl. ........ 382/100; 382/115; 382/284; 345/629; 358/3.28; 340/5.86; 348/589

(58) Field of Classification Search ................ 382/100, 382/115, 284; 358/3.28; 340/5.86
See application file for complete search history.

(56) References Cited

U.S. PATENT DOCUMENTS

| 5,291,243 | A | * | 3/1994 | Heckman et al. ................. 399/3 |
| 5,898,779 | A | * | 4/1999 | Squilla et al. ................. 713/176 |
| 6,243,480 | B1 | * | 6/2001 | Zhao et al. ..................... 382/100 |
| 6,487,301 | B1 | * | 11/2002 | Zhao ............................. 382/100 |
| 6,496,933 | B1 | * | 12/2002 | Nunally ........................ 713/176 |
| 6,886,863 | B1 | * | 5/2005 | Mowry et al. .................. 283/72 |
| 6,970,573 | B2 | * | 11/2005 | Carr et al. ..................... 382/100 |
| 7,206,431 | B2 | * | 4/2007 | Schuessler ..................... 382/100 |
| 7,715,593 | B1 | * | 5/2010 | Adams et al. ................. 382/115 |
| 2004/0060976 | A1 | * | 4/2004 | Blazey et al. ................. 235/375 |
| 2004/0156075 | A1 | * | 8/2004 | Hohensee et al. ............ 358/1.15 |
| 2004/0263911 | A1 | * | 12/2004 | Rodriguez et al. ........... 358/3.28 |
| 2009/0219136 | A1 | * | 9/2009 | Brunet et al. ................. 340/5.86 |

FOREIGN PATENT DOCUMENTS

JP 2001-309157 A 11/2001

* cited by examiner

*Primary Examiner* — Brian Q Le
*Assistant Examiner* — Jose M Torres
(74) *Attorney, Agent, or Firm* — Panitch Schwarze Belisario & Nadel LLP

(57) ABSTRACT

An image forming apparatus includes an image inputting section through which image information containing object information and secure object information is received, the object information representing at least one object and the secure object information indicating an object that should be protected against tampering. A first image-data generator generates first image data for forming an image, the first image data being generated in accordance with the object information. A secure object identifying section identifies a secure object based on the secure object information. A characteristic information detector extracts at least a part of the object information on the secure object, the part of the object information being a characteristic information on the secure object. A second image-data generator generates second image data for forming a characteristic image representing the characteristic information. An image data combiner combines the first image data and the second image data. An image forming section forms an image in accordance with the image data combined in the image data combiner.

5 Claims, 10 Drawing Sheets

FIG.3A

| TYPE OF OBJECT | OBJECT LOCATION INFORMATION | OBJECT ATTRIBUTE INFORMATION | OBJECT-SPECIFIC INFORMATION | APPARATUS INFORMATION |
|---|---|---|---|---|
| String | 100, 200 | 10 point | ABCDE | S/N 0001 |

FIG.3B

| TYPE OF OBJECT | OBJECT LOCATION INFORMATION | OBJECT ATTRIBUTE INFORMATION | APPARATUS INFORMATION |
|---|---|---|---|
| GRAPHICS | 500, 600 | AREA : 300<br>NUMBER OF LINE SEGMENTS : 3 | S/N 0001 |

FIG.3C

| TYPE OF OBJECT | OBJECT LOCATION INFORMATION | OBJECT ATTRIBUTE INFORMATION | APPARATUS INFORMATION |
|---|---|---|---|
| BIT MAP IMAGE | 300, 400 | R. G. B<br>100, 150, 200, | S/N 0001 |

FIG.6A

```
OBJECT A
Font name      : Gothic
Font size      : 10point
Color          : Red
String         : "ABCDE"
```

FIG.6B

```
OBJECT B
Font name      : Courier
Font size      : 10point
Color          : Black
String         : "ABCDE"
```

IMAGE FORMING APPARATUS

BACKGROUND OF THE INVENTION

1. Field of the Invention

The present invention relates to an image forming apparatus that is adapted to print image information containing tampering-detection information, and to a tampering-detection apparatus that verifies whether image formation information has been falsified.

2. Description of the Related Art

A variety of conventional art systems are available which protect document data from falsification or tampering. For example, a digest of a document to be protected against falsification is computed using a hash function at a transmitting end. The document is then sent together with the digest to a receiving end. A digest of the document received is produced using a hash function at the receiving end. Then, the digest produced at the receiving end is checked against the digest received from the transmitting end to detect whether any change has been made to the document. However, this method is difficult to apply to documents printed on paper such as securities, checks, and circulars. When a digest is produced based on the data read through an input device such as a scanner, if a printed material has been stained or soiled, the digest may well be different from that added to the printed matter originally. This leads to erroneous detection of falsification.

Japanese Patent Application Laid-Open No. 2001-309157 has proposed one such system that protects printed materials from falsification. With this system, an input device such as a scanner reads information from a paper document that should be protected. Then, a characteristic part of the thus read image, for example, a region including character strings is extracted from the image to produce characteristic information on the sampled region, e.g., the density of black pixels in the region. Then, the information containing the characteristic is printed. Likewise, characteristic information on the document is produced at the receiving end. The characteristic information added to the document received is compared with the characteristic information produced. If a difference between the two items of characteristic information is greater than a predetermined value, then it is determined that the document has been falsified.

With the aforementioned conventional art, if an original document is not accompanied by characteristic information, then the falsification cannot be detected. Thus, the original information should be preserved in a safe place until a document (referred to as notification document) having characteristic information is produced. Such data should be discarded once the notification document has been produced. When notification information is first converted into an electronic version and then the electronic version is transmitted, erroneous detection of falsification may occur depending on the parameters of a printer (e.g., resolution) on the receiving end. Moreover, in order to produce a notification document, it is necessary to scan the entire surface of the original document. This presents a problem of working efficiency.

SUMMARY OF THE INVENTION

The present invention was made in view of the aforementioned problems.

An object of the invention is to provide a verification system that eliminates the need for safekeeping or discarding the original documents.

Another object of the invention is to provide a verification system that is free from erroneous detection of falsification due to parameters of a printer such as resolution.

Still another object of the invention is to provide a verification system that eliminates the need for reading the original document by means of, for example, a scanner.

An image forming apparatus forms an image that is protected from tampering. Image information containing object information and secure object information is received through an image inputting section. The object information represents at least one object and the secure object information indicating an object that should be protected against tampering. A first image-data generator generates first image data for forming an image, the first image data being generated in accordance with the object information. A secure object identifying section identifies a secure object based on the secure object information. A characteristic information detector extracts at least a part of the object information on the secure object, the part of the object information being a characteristic information on the secure object. A second image-data generator generates second image data for forming a characteristic image representing the characteristic information. An image data combiner combines the first image data and the second image data. An image forming section forms an image in accordance with the image data combined in the image data combiner.

The object information contains object attribute information, object-specific information, and object location information.

The characteristic information contains the object attribute information of a secure object.

The characteristic information contains object location information of a secure object.

The secure object contains one of character information, graphics information, and bit map image information.

A verifier verifies whether an object has been tampered. An image data capturing section captures image data of an image formed in the aforementioned image forming apparatus. A characteristic image data extracting section extracts characteristic image from the image data. A characteristic image data analyzing section performs an image recognition processing of the image data extracted by the characteristic image data extracting section to produce characteristic information of the secure object. A secure object extracting section extracts a secure object from the image in accordance with the object location information contained in the characteristic information and produces object information on the secure object. A data verifying section checks the object information against the characteristic information to determine whether the image has been tampered.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein:

FIGS. 3A-3C illustrate examples of the characteristic data;

FIGS. 6A and 6B illustrate examples of secure objects;

DETAILED DESCRIPTION OF THE INVENTION

A first embodiment of an image forming apparatus according to the present invention will be described. The image forming apparatus receives image information that contains object data for objects such as characters, graphics, and bit map images, the object data being described in corresponding data formats. Then, the received object data is converted into print dot images in accordance with print resolutions, the number of levels of halftone, and the number of colors. The print dot images are then printed. A user uses a variety of application software to prepare document data on a host apparatus, and then converts the thus prepared document data into object data of corresponding data formats. This conversion is usually performed using driver software accepted by a printer in use. The object data is described in page description language (PDL) that is used in the communication between a host apparatus and a printer apparatus. If the object data is a train of characters, the object data described in PDL may include items of information such as attributes (font, size, and color, strings of ASCII codes that represent character strings) and positions at which objects are plotted.

At the receiving end, a printer receives the object data and produces dot images to print on an object-to-object basis, taking printer parameters such as resolution into account. The thus produced dot images to be printed are plotted at predetermined positions. The size of dot images to be printed should be such that printer parameters such as resolution are appropriate. Transmitting a document in an object format allows the document to be written on the host apparatus side regardless of the output resolution of the printer at the receiving end. This eliminates the burden of signal processing on the host apparatus and reduces the amount of data that should be transmitted to the printer.

Figure 1:
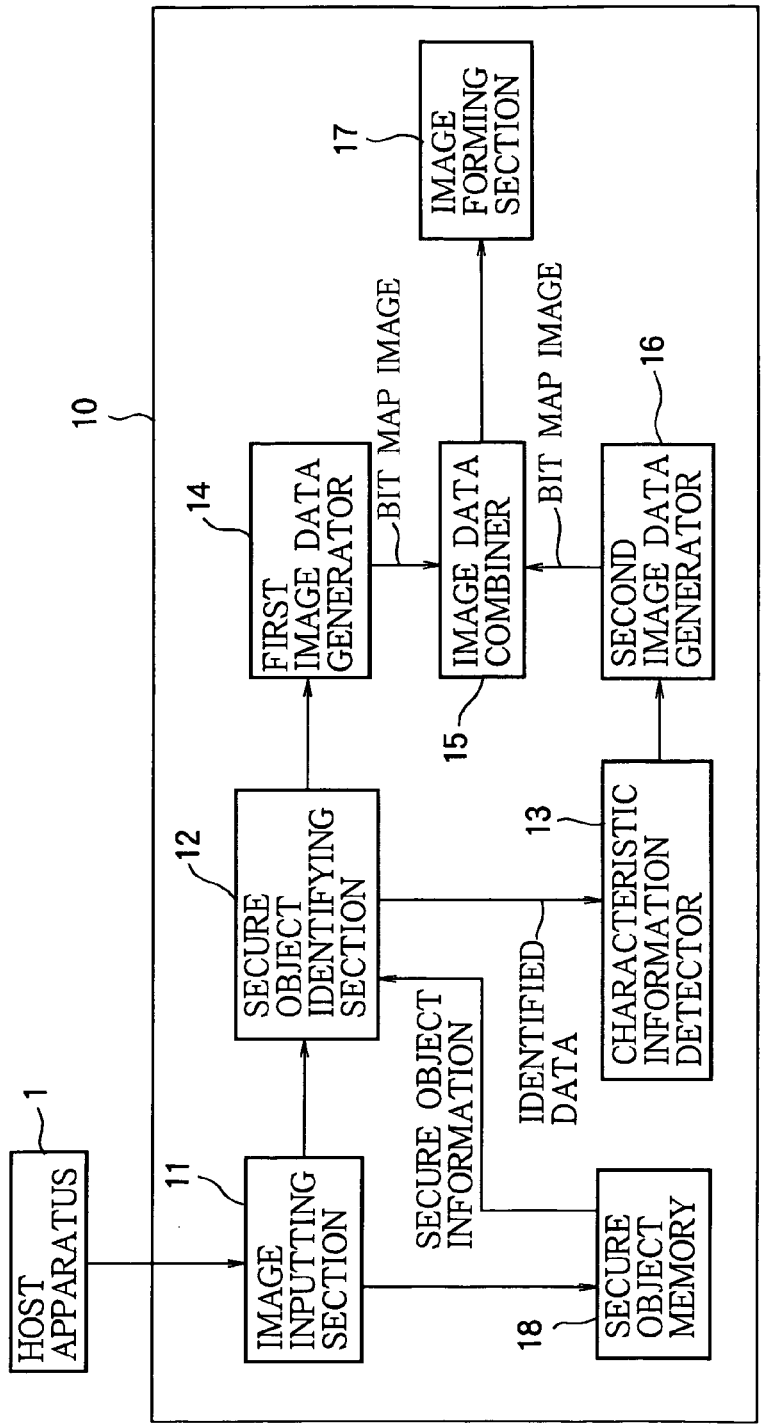
FIG. 1 illustrates a general configuration of a printer according to the first embodiment.

FIG. 1 illustrates a general configuration of a printer 10 according to the first embodiment. The printer 10 includes an image inputting section 11, a secure object identifying section 12, a characteristic information detector 13, a first image-data generator 14, a second image-data generator 16, an image data combiner 15, an image forming section 17, and a memory 18. In the following description, data to be protected against tampering will be described in terms of an object that contains a character string of a specific color.

First, a user produces application data using a variety of application software. By using software usually referred to as driver software, this application data is converted into object data adapted to the parameters of the printer 10 at the receiving end. The thus produced object data is transmitted to the printer 10 over a data communication line such as a USB interface or a network.

The printer 10 receives the object data on an item-by-item from a host apparatus 1 through the image inputting section 11. When a predetermined amount of object data that can be interpreted has been received, the object data is transferred to a succeeding processing module. The received object data is of generally two types: the first is print data, and the second is apparatus setting data that instructs changes of the settings of the printer 10. The apparatus-setting data includes apparatus-setting information for specifying print resolution and paper-discharging port of the printer, duplex or non-duplex printing, and printing mode (e.g., default mode). When the printer 10 receives the apparatus-setting data, the printer 10 updates its old apparatus-setting data stored in a memory of the printer 10 with the received apparatus-setting data.

Figure 2A:
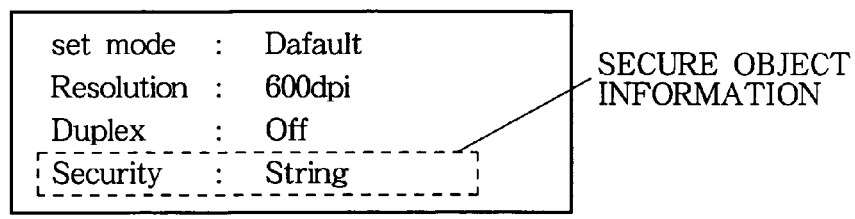
FIGS. 2A and 2B illustrate an example of received data, FIG. 2A illustrating setting data and FIG. 2B illustrating print data.
Figure 2B:
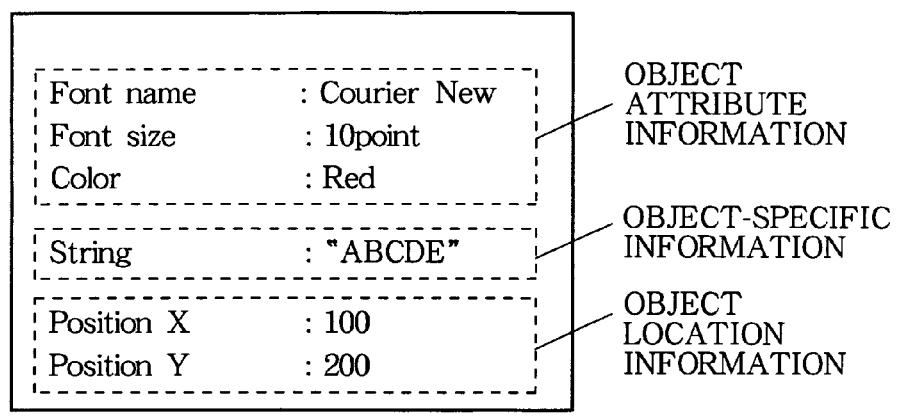

FIGS. 2A and 2B illustrate an example of data received from the host apparatus 1. FIG. 2A illustrates an example of apparatus-setting data that includes items of information on set mode (e.g., default mode), resolution (e.g., 600 dpi), and duplex printing (e.g., OFF). In the present embodiment, apparatus-setting information includes secure object information, i.e., information that identifies secure objects. Secure object is an object that is protected against tampering. With the example in FIG. 2A, a secure object is "String" indicating that a character string is protected from tampering. FIG. 2B illustrates print data describing that a string of red characters "ABCDE" is to be printed starting at coordinates (100, 200) with a size of 10 point. The content of the print data varies depending on the type of objects. The print data usually contains three types of information: object attribute information indicative of, for example, a color of an object, object-specific information that is unique to the object, and object location information that indicates the position at which the object should be printed.

The memory 18 holds the secure object information. For example, if the memory 18 holds "Courier new" as secure object information, all of objects written in "Courier new" are processed as a secure object. Likewise, if the memory 18 holds "red" as secure object information, all of objects having color information of "red" are handled as a secure object.

Users are allowed to set a secure object in a variety of ways. For example, it can be made a rule on the host apparatus 1 side that any application data (document data) written in red is to be protected from tampering. Then, it is only necessary to specify "red" for any objects to be protected regardless of types and locations of objects in a document. Alternatively, the secure object information may be a set of a plurality of conditions and thus objects to be protected are those that meet all of the plurality of conditions. Still alternatively, a secure object, i.e., object that should be protected from tampering may be a one that meets at least one of a plurality of conditions.

In accordance with the secure object information stored in the memory 18, the secure object identifying section 12 checks the items of data received from the image inputting section 11 to identify the data for a secure object. Then, the secure object identifying section 12 sends the identified data (secure object) to the characteristic information detector 13 and all the items of data received to the first image-data generator 14. The first image-data generator 14 checks the apparatus setting information and object attributes in the data received from the secure object identifying section 12, and produces bit-mapped image data in accordance with the data in an object format transferred. For example, using the print data in FIG. 2B, bit-mapped image data is produced to print a character string "ABCDE" in red in 10-point Courier New at a resolution of 600 dpi (600 dots per inch). Bit-mapped data is produced on an object-to-object basis and is sent one by one to the image data combiner 15 together with the corresponding object location information.

The characteristic information detector 13 extracts the necessary items of information from a secure object to group them as characteristic information (characteristic data).

FIGS. 3A-3C illustrate examples of the characteristic information (characteristic data).

For example, FIG. 3A illustrates an example of the characteristic data for the case in FIG. 2. This characteristic data indicates that the type of a secure object is "String," the object location information is a location described by coordinates (100, 200), and the object attribute information is "10-point size Courier New", the object-specific information of the object is "ABCDE", and the number of apparatus is S/N0001. In addition to the object-specific information, the characteristic data may also include font attributes such as underline if a secure object is a character string. Any information can be employed as characteristic information and are set by considering the specifications and functions of a printer and the specifications and functions of a verification-apparatus that verifies the document printed by the printer.

FIG. 3B illustrates an example of the characteristic data in which the type of object is graphics. FIG. 3C illustrates an example of the characteristic data in which the type of object is a bit map image.

If the entire characters are selected as a secure object, the amount of data that describes characteristic information may become too large. In such a case, for example, character strings may be processed to reduce the amount of data by using a one way hash function. Use of a one way hash function for encryption is a widely used technique in transmitting and receiving data through a net work. Hash function provides an algorithm for computing a uniquely determined value (i.e., hash value) having a fixed length. Hash function has a feature that input information is extremely difficult to decode based on a hash value. When such a hash function is employed, object-specific information in a document is first obtained on the receiving end. Then, a hash value of the thus obtained object-specific information is obtained by using a hash function. Then, a check is made to determine whether the thus obtained hash value is the same as the hash value contained in the document received. In this manner, verification can be performed to determine whether the document has been tampered.

A case will be described in which the entire character string is processed, without using a hash function, so that the characteristic information covers the entire characters.

The second image data generator 16 converts the characteristic data extracted by the characteristic information detector 13 into bit-mapped image data. An example of bit-mapped image data is a bar code located at a predetermined position on a printer material. The image data combiner 15 combines the bit-mapped image data that describes an image of a printed document produced by the first image-data generator 14 with the bit-mapped image data that describes a bar code produced by the second image data generator 16. One way of combining the bit-mapped image data is to implement the logical OR operation of the bit map data on a bit-by-bit basis. For example, bar codes may be printed with color dots of, for example, yellow dots that are not easy for human eyes to perceive, so that embeded tampering detection information is inconspicuous.

Figure 4:
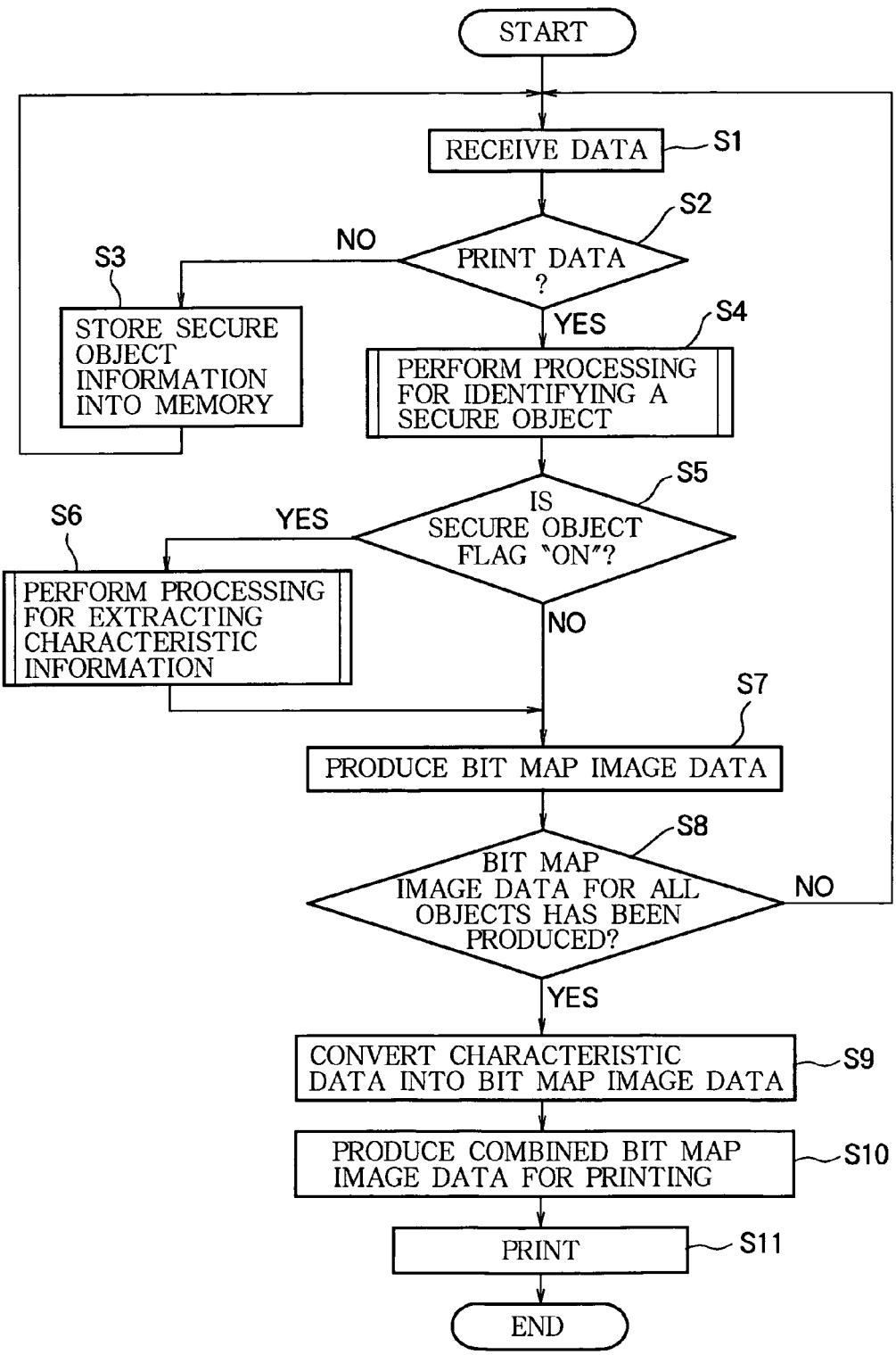
FIG. 4 illustrates a flowchart illustrating the operation of the printer.

FIG. 4 illustrates a flowchart illustrating the operation of the printer 10. The operation of the aforementioned printer 10, from data reception to printing, will be described with reference to the flowchart in FIG. 4.

The printer 10 receives data on an object-by-object basis from the host apparatus 1 through the image inputting section 11 (step S1). The image inputting section 11 checks whether the received data is print data or apparatus setting data that commands alteration of the apparatus settings (step S2). If the received data is the apparatus setting data, then the settings of the apparatus are updated in accordance with the apparatus setting information contained in the apparatus setting data. Then, secure object information, which is a part of the apparatus setting information, is stored into an area of the memory 18 (step S3). Then, the program loops back to step S1. If the received data is print data at step S1, then the received data is transferred on an object-by-object basis to the secure object identifying section 12. Upon receiving the object data from the image inputting section 11, the secure object identifying section 12 initiates the processing for identifying a secure object (step S4), which will be described later.

If the secure object flag is "1" at step S5, then the secure object identifying section 12 sends the object data to the characteristic information detector 13. If the secure object flag is "0" at step S5, then the secure object identifying section 12 does not send the object data to the characteristic information detector 13 but to the first image-data generator 14. The characteristic information detector 13 extracts characteristic information from the secure object information (step S6), which will be described later.

The first image-data generator 14 receives a train of print dots from the secure object identifying section 12 and produces bit-mapped image data in accordance with the current apparatus-setting information (step S7). The aforementioned steps are repeated until bit-mapped image data for all the objects has been produced (step S8). Then, the second image data generator 16 receives the characteristic data transferred from the characteristic information detector 13 and converts the characteristic data into bit-mapped image data (step S9). The image data combiner 15 performs an arithmetical operation of the bit-mapped image data produced by the first image-data generator 14 and the bit-mapped image data that the second image data generator 16 produced from the characteristic data, thereby producing combined bit-mapped image data for printing (step S10) The image forming section 17 performs printing in accordance with the bit-mapped image data for printing (step S11).

Figure 5:
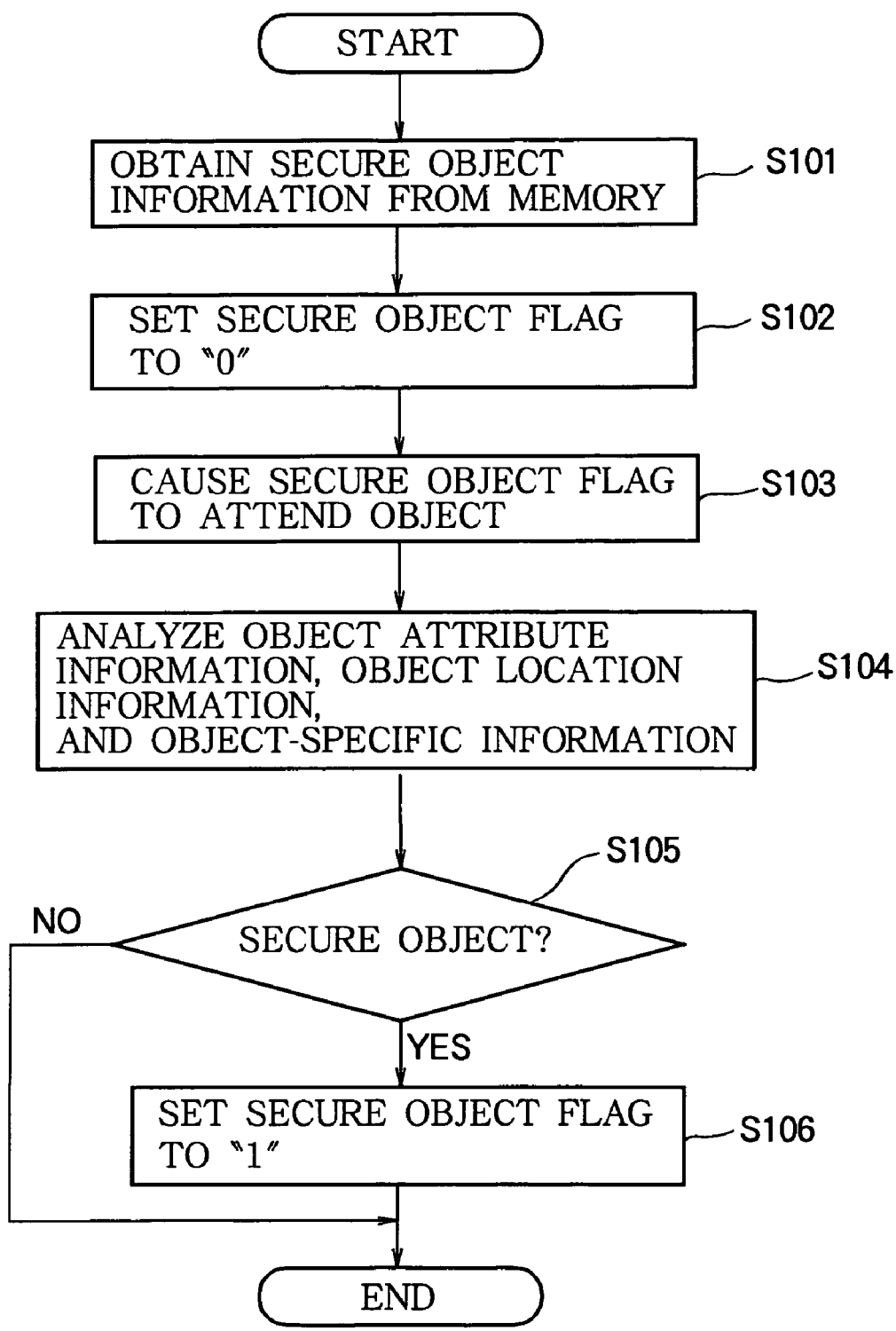
FIG. 5 is a flowchart illustrating the processing for identifying a secure object at step S4 in FIG. 4.

FIG. 5 is a flowchart illustrating the processing for identifying a secure object, performed at step S4 in FIG. 4. The processing for identifying a secure object will be described with reference to the flowchart in FIG. 5. Upon receiving the object data from the image inputting section 11, the secure object identifying section 12 obtains the secure object information from the memory 18, (steps S101). The secure object identifying section 12 then sets the secure object flag to "0" (step S102) and subsequently causes this secure object flag to attend the object data (step S103). The secure object identifying section 12 then analyzes the object information (object attributes information, object location information, and object-specific information by referring to the secure object information (step S104). The secure object identifying section 12 determines based on the analysis whether the object is a secure object (step S105). If the object is a secure object, then the secure object identifying section 12 sets the secure object flag to "1" (step S106).

FIGS. 6A and B illustrate examples of secure objects. Referring to FIG. 6A, object A is a character string of red "Gothic" characters "ABCDE" having a font size of 10 point. Referring to FIG. 6B, object B is a character string of black "Courier" characters "ABCDE" having a font size of 10 point. If "Gothic" characters are held in the memory 18 as the secure object information, it is determined that object A is a secure object and object B is not a secure object. If black is held as the secure object information, it is determined that object B is a secure object and object A is not a secure object.

Figure 7:
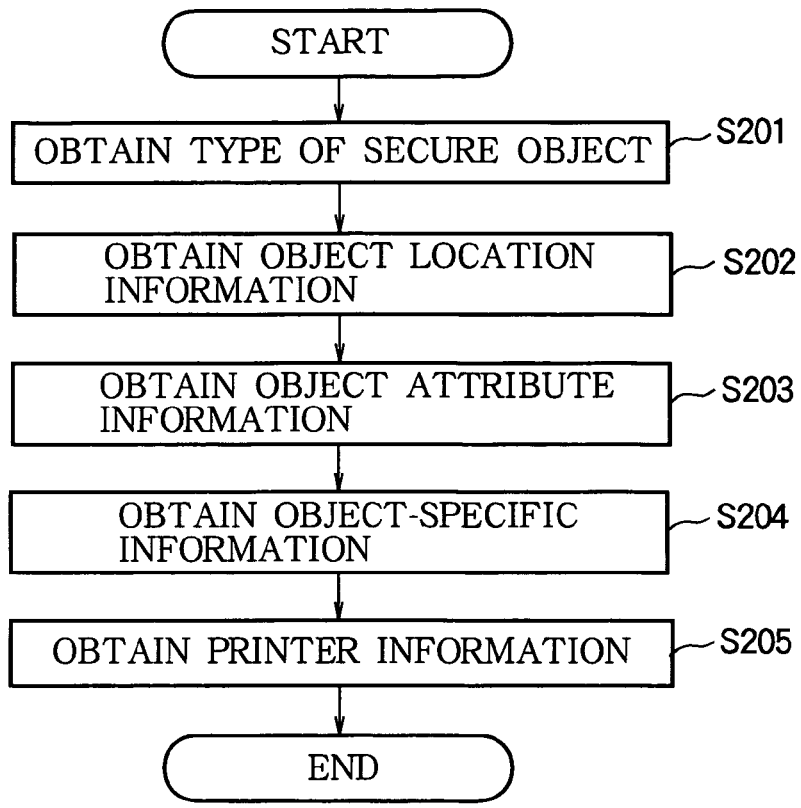
FIG. 7 is a flowchart illustrating the operation of a characteristic information detector.

FIG. 7 is a flowchart illustrating the operation of the characteristic information detector 13. The operation (step S6 in FIG. 4) of the characteristic information detector 13 will be described with reference to the flowchart in FIG. 7 in detail.

Upon receiving a secure object from the secure object identifying section 12, the characteristic information detector 13 obtains the type of the secure object (step S201), object location information (step S202), object attributes information (step S203), object-specific information (step S204), and finally printer information such as the serial number of the printer (step S205). These items of information obtained are then transferred to the second image data generator 16.

Figure 8:
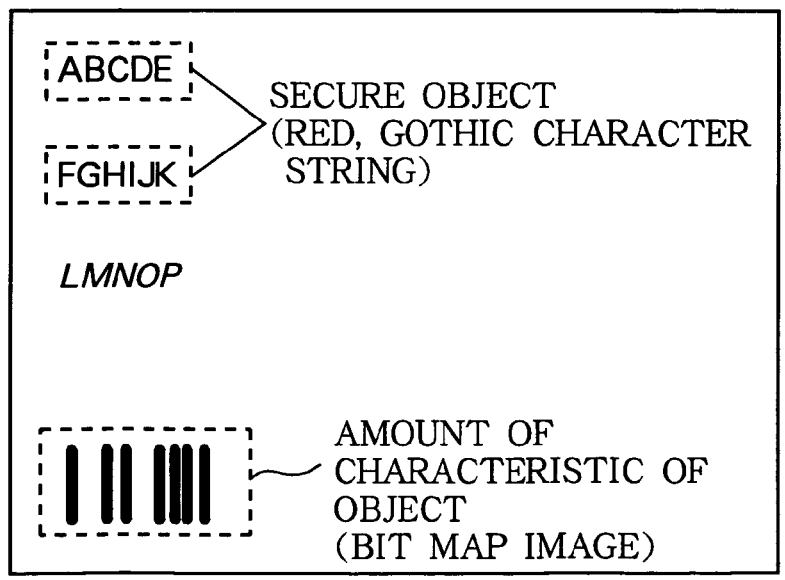
FIG. 8 illustrates an example of print results.

FIG. 8 illustrates an example of print results. In the example, the setting secure object information contains the following. The font is "Gothic," the color is "red," and the type of object is "String". Two strings of characters "ABCD" and "FGHIJK" are secure objects. Thus, the printed bar code in FIG. 8 describes the amount of characteristic of these objects. In this example, even if the margin area and a character string "LMNOP" have been tampered, such tampering cannot be detected.

The aforementioned example has been described with respect to character strings. However, secure objects are not limited to character strings. For example, graphics enclosed by line segments may be protected from tampering, in which case, characteristic data can be produced based on the area of the graphics and the number of line segments as shown in FIG. 3B. A bit map image can also be protected from tampering, in which case, characteristic data can be produced based on an average density of pixels, an average value of hues (R, G, B), or the dispersion of these as shown in FIG. 3C. As described above, according to the embodiment, an arbitrary object in a document can be specified as a secure object, i.e., can be protected against tampering. This feature is free from erroneous detection of tampering that would otherwise be caused by stain and soiling on portions of a document of less importance. Some comment may be inserted into a margin of a printed material if the printed material is a document for circulation. As opposed to the conventional art, the aforementioned configuration eliminates the need for reading the original document before information for detecting tampering is embedded into the document, allowing easy and simple management of the original document.

An example of a verifier 30 according to the invention will be described.

Figure 9:
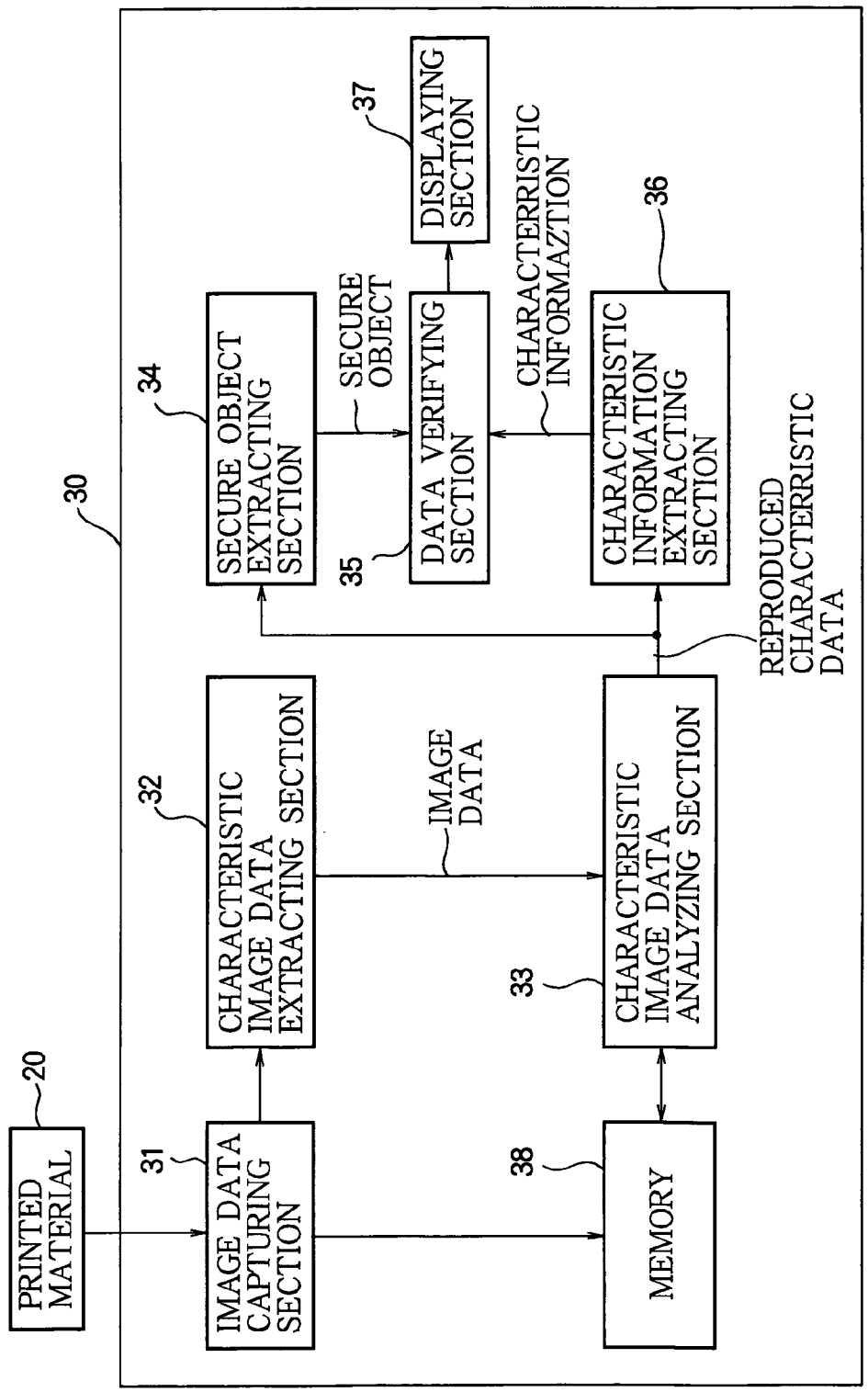
FIG. 9 is a block diagram illustrating the configuration of a verifier according to the invention.

FIG. 9 is a block diagram illustrating the configuration of the verifier 30. The verifier 30 includes an image data capturing section 31, a characteristic image data extracting section 32, a characteristic image data analyzing section 33, an secure object extracting section 34, a data verifying section 35, a characteristic information extracting section 36, a displaying section 37, and a memory 38. The characteristic image data analyzing section 33 and characteristic information extracting section 36 form a characteristic image data analyzing means.

The following description assumes that an object formed of a character string having a specific color is protected. A description will now be given of a case in which when the printed material has tampering detection information embedded using the printer 10, detection is made to determine whether a printed material has been tampered. It is assumed that the verifier 30 has been installed within the printer 10 connected to an image-inputting device such as a scanner.

Figure 10:
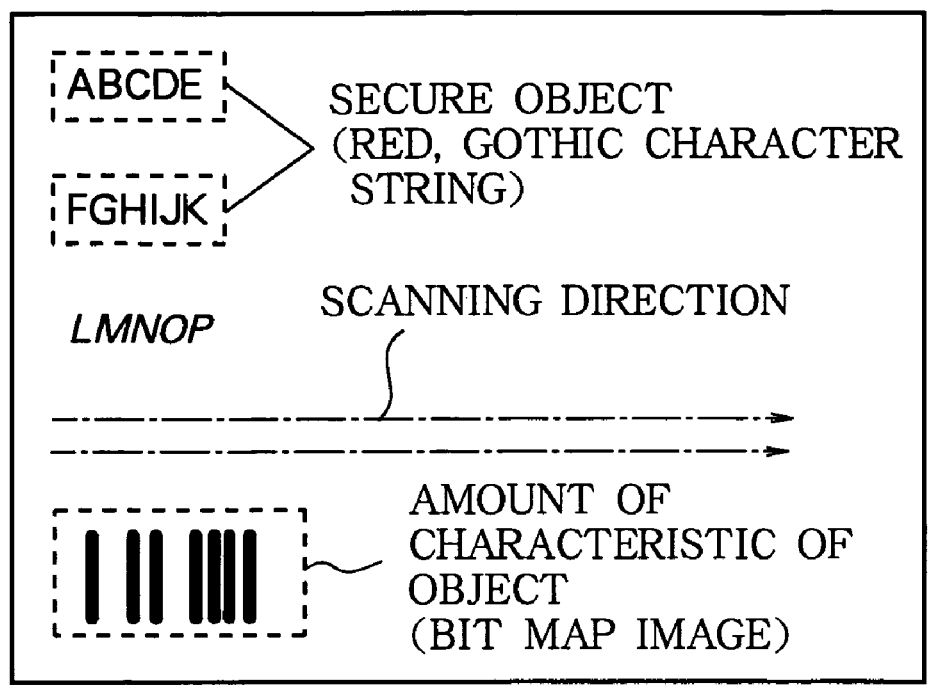
FIG. 10 illustrates a material printed with the printer.

FIG. 10 illustrates a material printed with the printer 10. Referring to FIG. 10, the tampering detection information has been embedded in character strings "ABCDE" and "FGHIJK". The image data capturing section 31 reads the printed material by using a scanner, which scans the printed material in a direction shown by arrow in FIG. 10. The characteristic image data extracting section 32 extracts image data that describes a region of a characteristic image from the image data that the image data capturing section 31 captured from a printed material 20. The characteristic image data analyzing section 33 performs an image recognition processing of the characteristic image data extracted by the characteristic image data extracting section 32, thereby producing the characteristic data. For example, if characteristic data in the form of a bar code has been embedded in the printed material, then the original characteristic data can be reproduced based on the continuity of dots that form the bar code and the spacing between dots. The characteristic image data analyzing section 33 determines the number of secure objects based on the thus reproduced characteristic data. Then, the characteristic image data analyzing section 33 stores the number of secure objects into the memory 38, while also transferring the reproduced characteristic data to the secure object extracting section 34 and the characteristic information extracting section 36 on an object-by-object basis. The characteristic data is assumed to contain the information in FIGS. 3A-3C.

The characteristic information extracting section 36 extracts characteristic information (object location information, object attribute information, and object-specific information from the characteristic data received from the characteristic image data analyzing section 33 on an object-by-object basis. Then, the characteristic information extracting section 36 transfers the characteristic information to the data verifying section 35. The secure object extracting section 34 receives the characteristic data from the characteristic image data analyzing section 33 and extracts the object location information from the characteristic data received. Then, based on the object location information, the secure object extracting section 34 separates the secure object from the image data received in the image data capturing section 31, and then transfers the secure object to the data verifying section 35. The data verifying section 35 performs an image recognition processing of the secure object to produce object information, and compares the thus produced object information with the characteristic information received from the characteristic information extracting section 36. For example, if a secure object is a character string, the data verifying section 35 performs the character recognition processing to produce a character string as object-specific information. Then, the data verifying section 35 verifies whether the thus produced character string is coincident with the character string received from the characteristic information extracting section 36. If the system is capable of handling color information, comparing the color information of the character strings provides more accurate verification.

Figure 11:
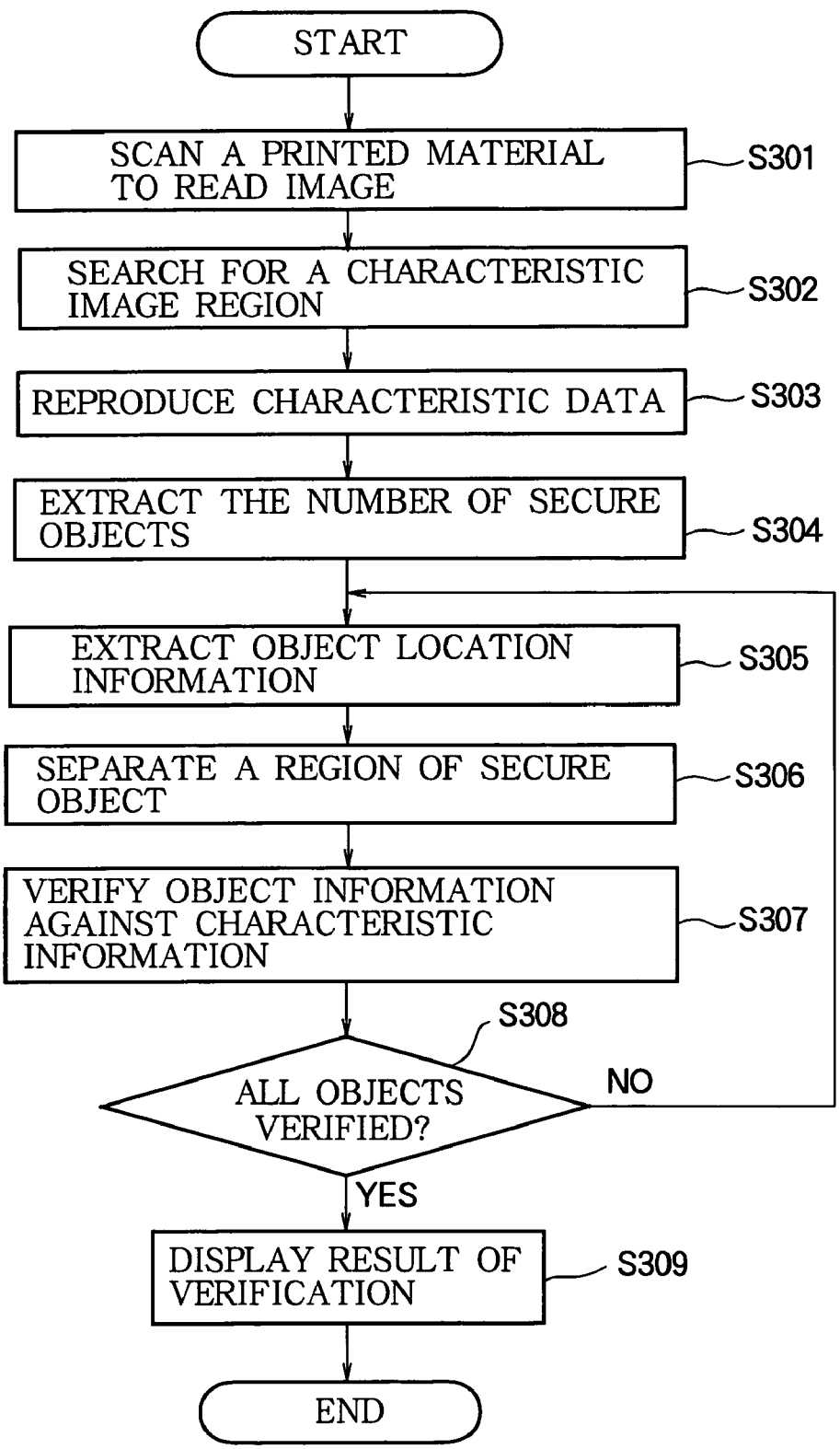
FIG. 11 is a flowchart illustrating the verification.

FIG. 11 is a flowchart illustrating the operation of a verifier. The verification performed by the verifier will be described with reference to the flowchart in FIG. 11. The printed material 20 is to be detected whether it has been tampered. An image of the printed material 20 is read through, for example, a scanner (step S301). A search is made to detect a characteristic image region in the thus captured image data, the characteristic image region representing characteristic data of the secure object (step S302). Then, the characteristic image data analyzing section 33 analyzes the image data in the characteristic image region to reproduce the characteristic data (step S303), and sends the information on the memory 38 (step S304). Then, the secure object extracting section 34 extracts object location information from the characteristic data (step S305), and then separates a region of the secure object from the thus obtained object information (step S306). Thereafter, the secure object extracting section 34 performs an image recognition processing on the region of the object in such a way that the object information obtained by the image recognition processing is checked with the characteristic information obtained from the characteristic data, thereby verifying whether there is any discrepancy between the object information and the characteristic information (step S307). Steps S305 to S307 are repeated for all objects protected (step S308). The verification results are stored one by one into the displaying section 37 and information is displayed to show whether the document has been tampered (step S309).

The verification apparatus according to the invention verifies a fractional part of the printed material. Therefore, even if a printed document has been stained or soiled in areas of less importance or a printed document has a margin in which some comments are hand-written, the document can be verified accurately without erroneous detection.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An image forming apparatus comprising;
   an image inputting section through which image information in the form of object data is received from an external apparatus, the image information containing object information and secure object information, the object information representing at least one object and the secure object information representing a type of the secure object;
   a first image-data generator that generates first image data for forming an image, the first image data being generated in accordance with the object information;
   a secure object identifying section that detects secure object information and identifies a type of the secure object;
   a characteristic information detector that extracts the secure object from the received image information based on the type of the secure object identified by the secure object identifying section;
   a second image-data generator that generates second image data based on the secure object extracted by said characteristic information detector;
   an image data combiner that combines the first image data with the second image data; and
   an image forming section that forms an image in accordance with the image data combined in said image data combiner.

2. The image forming apparatus according to claim 1, wherein the object information contains object attribute information, object-specific information, and object location information.

3. The image forming apparatus according to claim 1, wherein the secure object information contains object attribute information of the secure object.

4. The image forming apparatus according to claim 1, wherein the secure object information contains object location information of the secure object.

5. The image forming apparatus according to claim 1, wherein the secure object contains one of character information, graphics information, and bit map image information.

* * * * *